US012757131B2

(12) United States Patent
Mochizuki

(10) Patent No.: US 12,757,131 B2
(45) Date of Patent: Oct. 6, 2026

(54) APPARATUS AND SYSTEM TO REDUCE PARASITIC PHENOMENA IN WIRELESS COMMUNICATION, AND METHOF THEREOF

(71) Applicant: NEC Corporation, Tokyo (JP)

(72) Inventor: Takuji Mochizuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 563 days.

(21) Appl. No.: 18/205,328

(22) Filed: Jun. 2, 2023

(65) Prior Publication Data

US 2024/0089877 A1 Mar. 14, 2024

(30) Foreign Application Priority Data

Sep. 13, 2022 (JP) ................................ 2022-145427

(51) Int. Cl.
*H04W 52/52* (2009.01)
*H04W 52/42* (2009.01)

(52) U.S. Cl.
CPC ........... *H04W 52/52* (2013.01); *H04W 52/42* (2013.01)

(58) Field of Classification Search
None
See application file for complete search history.

(56) References Cited

U.S. PATENT DOCUMENTS 8,891,598 B1 * 11/2014 Wang ........................ H04B 7/08 455/39
2007/0111686 A1 * 5/2007 Lee ........................ H03F 1/0211 455/127.3
2010/0148864 A1 * 6/2010 Ishikawa ............... H03F 1/0266 330/127

(Continued)

FOREIGN PATENT DOCUMENTS

JP 2012-227795 A 11/2012
JP 2019-029934 A 2/2019
WO 2023/188161 A1 10/2023

OTHER PUBLICATIONS

ECC Recommendation (15)01, "Cross-border coordination for Mobile/Fixed Communications Networks (MFCN) in the frequency bands: 694-790 MHZ, 1427-1518 MHz and 3400-3800 MHZ", Approved Feb. 13, 2015, latest amendment on Feb. 14, 2020.

(Continued)

*Primary Examiner* — Dung C Dinh

(57) ABSTRACT

In a wireless communication apparatus according to the present disclosure, a determination unit detects presence or absence of a transmission signal for each transmission symbol in each of a plurality of transmitters. In response to detection of presence of the transmission signal at any transmitter of the plurality of transmitters and absence of the transmission signal at all of the plurality of transmitters in a transmission symbol before a transmission symbol to which the any transmitter transmits a transmission signal, the determination unit causes a stabilization signal to pass (Continued)

through the any transmitter and any transmission amplifier before the transmission signal passes through the any transmitter and the any transmission amplifier by inserting the stabilization signal for stabilizing characteristics of the any transmission amplifier associated to the any transmitter into a time domain preceding a time domain of the transmission signal.

10 Claims, 13 Drawing Sheets

(56) References Cited

U.S. PATENT DOCUMENTS

| | | | | |
|---|---|---|---|---|
| 2017/0176507 | A1 | 6/2017 | O'Keeffe et al. | |
| 2018/0167091 | A1* | 6/2018 | Pratt | H04B 1/0483 |
| 2019/0044624 | A1 | 2/2019 | Mochizuki | |
| 2019/0386755 | A1* | 12/2019 | Kobayashi | H04B 17/21 |
| 2021/0152133 | A1* | 5/2021 | Mochida | H03F 3/245 |
| 2021/0242841 | A1* | 8/2021 | Hayashi | H03F 1/02 |
| 2024/0146503 | A1* | 5/2024 | Beikmirza | H04B 1/04 |
| 2025/0192735 | A1 | 6/2025 | Mochizuki | |

OTHER PUBLICATIONS

Japanese Official Communication for JP Application No. 2022-145427 mailed on Jun. 16, 2026 with English Translation.

Florian, Corrado et al., "Pre-pulsing characterization of GaN PAs with dynamic supply", 2016 IEEE MTT-S International Microwave Symposium, 2016.

Cappello, Tommaso et al., "Linearization of a 500-W L-band GaN Doherty Power Amplifier by Dual-Pulse Trap Characterization", 2019 IEEE MTT-S International Microwave Symposium, 2019, pp. 905-908.

Barradas, Filipe et al., "Compensation of Power Amplifier Long-Term Memory Behavior for Pulsed Radar Applications", IEEE Transactions on Microwave Theory and Techniques, Dec. 2019, pp. 5249-5256.

* cited by examiner

| GERMANY'S NEIGHBORING COUNTRIES ACROSS BORDERS | 5G TDD Config IN NEIGHBORING COUNTRIES. (D:DL Frame, U:UL Frame, S:Special Subframe) |
|---|---|
| Denmark | DDDSU |
| Poland | DDDSU |
| Czech | DDDSU |
| Austria | DDDSU or DDDSUUDDDD or DDDDDDDSUU w/~3ms shift (SAME AS DDDSUUDDD IN TERMS OF CONFIG.) |
| Switzerland | DDDSU or DDDDDDDSUU w/~3ms shift (SAME AS DDDSUUDDD IN TERMS OF CONFIG.) |
| France | DDDSUUDDDD |
| Belgium | DDDSU |
| Luxembourg | DDDSU |
| Netherlands | DDDSU |

Fig. 1

APPARATUS AND SYSTEM TO REDUCE PARASITIC PHENOMENA IN WIRELESS COMMUNICATION, AND METHOF THEREOF

INCORPORATION BY REFERENCE

This application is based upon and claims the benefit of priority from Japanese patent application No. 2022-145427, filed on Sep. 13, 2022, the disclosure of which is incorporated herein in its entirety by reference.

TECHNICAL FIELD

This disclosure relates to a wireless communication apparatus, a wireless communication system, and a wireless communication method.

BACKGROUND ART

Gallium Nitride (GaN) has advantages over Gallium Arsenide (GaAs) in terms of large band gap energy, which enables high-withstand-voltage and miniaturization, and of high electron mobility. Therefore, in wireless communication apparatuses such as base stations for wide areas, macro base stations, and Active Antenna Systems (AASs), AMPlifiers (AMPs) using Field Effect Transistors (GaN FETs), GaN High Electron Mobility Transistors (HEMTs), or GaN Two-Dimensional Electron Gas FETs (2DEG FETs) (hereinafter referred to as “GaN AMP(s)” as appropriate) are used as transmission AMPs.

However, the transmission AMPs, that is, GaN AMPs, need to be engineered for various parasitic phenomena when operated at large amplitudes and high powers. Among these parasitic phenomena, for example, a phenomenon called “current collapse” is a phenomenon in which the drain current decreases as a drain voltage is applied. For the current collapse, see, for example, Japanese Unexamined Patent Application Publication No. 2012-227795.

In addition, transient phenomena called “drain lag” and “gate lag” are also problematic in the transmission AMP, that is, a GaN AMP. In a transmission AMP in Class C or above, Class C amplification begins when the drain current flows in response to an amplitude at or above a certain level of a transmission signal, and a matching circuit that matches an output of the transmission AMP outputs a basic amplified signal. The drain lag is a phenomenon in which the drain current changes transiently and slowly until it reaches a steady-state voltage condition when the drain voltage is abruptly turned OFF to ON to enable an amplification operation of the transmission AMP. The wireless communication apparatus equipped with the transmission AMP turns the transmission AMP OFF/ON as it switches between Up Link (UL) and Down Link (DL) when operating in Time Division Duplex (TDD). During OFF/ON start-up of the transmission AMP, an abrupt OFF/ON control is performed, which instantly changes the gate voltage from a Pinch-OFF state (a depletion layer spreads by setting the gate voltage deep enough with respect to an electron transfer channel under the gate, which closes the electron transfer channel between the drain and source. This state is referred to as “pinch-off” and such gate voltage values are referred to as “pinch-off voltage”) to the gate voltage at which the desired drain current flows. The gate lag is a phenomenon in which the drain current changes transiently and slowly in response to the abrupt control of the gate voltage until it reaches the steady-state voltage condition. These gate lag and drain lag (hereinafter referred to as “Gate/Drain Lag” as appropriate) also cause transient response delay failure until it reaches a normal state when the transmission AMP, that is, GaN AMP, performs a high-speed OFF/ON operation and a burst operation to perform a TDD operation. The normal state means that nonlinear distortion characteristics such as a gain, an output, an amplitude modulation (AM)-AM/AM-Phase Modulation (PM), etc., are in a steady state. Here, base stations of Long Term Evolution (LTE) and Fifth Generation (5G), in situations under a TDD system, perform low-power consumption adaptive control through a bursting operation in which the transmission AMP is turned on and off temporally or through an operation in which the transmission AMP is frequently turned on and off according to the transmission symbol. In that case, the transient response delay described above requires a noticeable acceleration of the ON control of the transmission AMP, which takes a lot of time before the transmission signals are stabilized.

In the transmission AMP, that is, a GaN AMP, when transient phenomena such as the Gate/Drain Lag described above occur, a change may occur in the charging state of deep levels and surface levels on a substrate of the GaN FET, and the same state causes charging/discharging by mobile electrons in the channel being trapped, so that the charging/discharging time has a certain time constant. This causes a significant delay in the drain current to reach a target steady-state drain current due to the OFF/ON of the transmission AMP before input of the transmission signal to the transmission AMP. As a result, when the transmission signal passes through the transmission AMP, the gain, the output, and the nonlinear distortion characteristics of a head part of the transmission signal will not reach their normal states. This leads to the inability to ensure stable characteristics of the transmission AMP each time the transmission AMP is turned ON in the low-power consumption adaptive control described above.

Accordingly, when LTE and 5G base stations employ transmission AMPs, which corresponds to GaN AMPs, it will be difficult to perform the low-power consumption adaptive control, etc., described above, in the situations under the TDD system, and this will cause many problems for the system characteristics of the TDD system.

The findings show that, in the case of a wireless communication apparatus equipped with a transmission AMP, that is, a GaN AMP with poor Gate/Drain Lag, an overshoot occurs in the Error Vector Magnitude (EVM) of a head symbol in a transmission signal immediately after the transmission AMP is turned on, which may lead to a number of problems. Therefore, it is necessary to suppress the overshoot of the EVM of the head symbol of the transmission signal to avoid the occurrence of problems caused by the overshoot.

In order to do so, it is contemplated, for example, to insert the AMP stabilization signal, which is as broadband as possible, into a time domain preceding a time domain of the transmission signal to make the AMP stabilization signal pass through the transmission AMP before the transmission signal passes through the transmission AMP the transmission signal.

In other words, the current collapses and the Gate/Drain Lags of the transmission AMP is eliminated in an early stage by inputting the AMP stabilization signal to the transmission AMP before the head symbol of the transmission signal is input to the transmission AMP. This allows early ending of characteristic mutations caused by the current collapses and the Gate/Drain Lags of the transmission AMP and stabilization of nonlinear distortion characteristics such as the gain, the output, and AM-AM/AM-PM of the transmission AMP. This avoids the occurrence of many problems caused by the overshoot of the EVM of the head symbol of the transmission signal, thus ensuring signal quality from the head symbol of the transmission signal or an arbitrary head symbol in a transmission Slot. At a moment when the head symbol of the transmission signal is input to the transmission AMP, the AM-AM/AM-PM characteristics of the transmission AMP in the head symbol segment of the transmission signal are pre-stabilized, so the head symbol and subsequent Symbols of the transmission signal are stably distortion-compensated by Digital Pre-Distortion (DPD) in a transmitter TX. This also contributes to a fact that the head symbol guarantees the signal quality of the DL signal. Note that the TX is provided in TRX, that is, a transmitter/receiver.

As described above, the wireless communication apparatus equipped with transmission AMPs, that is, GaN AMPs with poor Gate/Drain Lag, may experience problems due to the overshoot of the EVM in the head symbol of the transmission signal. However, such problems can be avoided by inserting the AMP stabilization signal into the time domain preceding the time domain of the transmission signal.

However, the inventor found two new issues when adopting the configuration of inserting the AMP stabilization signal to the wireless communication apparatus described above. These two issues will be described below. Note that the above-mentioned wireless communication apparatus is described as an AAS (Radio Unit (RU)) configured to transmit DL signals to each user equipment (UE: mobile terminal) as a transmission signal.

First Issue:

In Europe, a TDD configuration may differ between neighboring countries across borders because the countries are adjacent to each other on land. Being different in the TDD configuration between neighboring countries is hereinafter referred to as “heterogeneous TDD configuration” as appropriate. As shown in FIG. 1, the TDD configuration is represented by “D (DL Frame)”, “U (UL Frame)”, and “S (Special Subframe)”, for example, the TDD configuration for Germany is “DDDSU”. In contrast, the TDD configuration of three of Germany’s neighbors, Austria, Switzerland, and France, differs from the TDD configuration in Germany.

Therefore, when building a 5G system as a TDD system, especially in Europe, it is necessary to support DL blanking when the heterogeneous TDD configuration exists between neighboring countries across the border. The DL blanking is a criterion that provides a no-transmission segment for DL signals to avoid interference of the DL signals with UL signals transmitted from AASs (RUs) in neighboring countries. In detail, AAS (RU) may control the TX to ON in the no-transmission segment, but does not transmit the DL signals. The criteria for this DL blanking are specified in the following Non-Patent Literature 1.

ECC Recommendation (15)01, “Cross-border coordination for Mobile/Fixed Communications Networks (MFCN) in the frequency bands: 694-790 MHz, 1427-1518 MHz and 3400-3800 MHz”, Approved 13 Feb. 2015, latest amendment on 14 Feb. 2020.

It is also expected that AAS (RU) having a beam forming capability, which requires a plurality of the TXs, will be the norm in 5G systems. Therefore, for example, it is conceivable that the AAS (RU) for domestic use, which does not need to support the DL blanking, and the AAS (RU) that is placed near the border, which has a heterogeneous TDD configuration and needs to support the DL blanking, are created separately before shipment from the factory in advance. However, the AAS (RU) placement plan obtained from an Operator is often unpredictable in advance. In addition, if an attempt is made to manufacture different types of the AASs (RUs), restrictions on placement will increase in that AASs (RUs) that are once shipped as an AAS (RU) for domestic use and then placed at a border that needs to support DL blanking will need to be customized using Remote Software Update. Therefore, the manufacturing different types of AASs (RUs) is not preferred by the Operator.

Therefore, it is important to ship AASs (RUs) that can autonomously determine whether to implement and stop insertion of the AMP stabilization signal without having to make different types of the AASs (RUs) for supporting the DL blanking or not in advance.

Second Issue:

In addition, to achieve low-power consumption of 5G systems, especially in Europe, it is necessary to support Micro-sleep Mode with ON/OFF of the transmission AMP for each DL symbol. However, when supporting the Micro-sleep Mode, if the AAS (RU) autonomously detects presence or absence of a DL signal for each DL symbol for each TX in the AAS (RU) and randomly inserts the AMP stabilization signal based on autonomous determinations, the following problems also arise. For example, suppose that in a certain DL symbol, a DL signal is present at a certain TX. In this case, AAS (RU) shall insert the AMP stabilization signal to the beginning of the DL symbol for the TX that is determined to have the DL signal. However, if another TX is transmitting a DL signal in a DL symbol before the corresponding DL symbol, the radiation of the AMP stabilization signal may cause interference to the DL signal being transmitted by above-mentioned another TX in a propagation space.

When a plurality of terminals are spatially multiplexed by beam forming from AASs (base stations), such as Multi-User MIMO (MU-MIMO) and Massive-MIMO, algorithms such as Zero-Forcing method are used. In that case, according to the UL (Up-Link) signal received by each receiver of the AAS from the plurality of terminals, Null is formed as a radiation pattern to other terminals, in contrast to a beam direction to each terminal, to make the DL (Down-Link) radiation signal from the AAS to each terminal spatially orthogonal. This allows spatial multiplexing to the plurality of terminals in AAS. In this case, the UL received signal from each terminal to the AAS uniquely forms the DL radiation signal to each terminal and the Null in a direction of other terminals. In this case, if an AMP stabilization signal, which is completely uncorrelated with the UL signal from each terminal, is radiated into the same DL radiation signal just before the DL, the same AMP stabilization signal may interfere with a transmission radiation radiating the DL symbol before the DL symbol. Therefore, the spatially multiplexed orthogonality between the plurality of terminals formed by the same interfered DL signal portion is disturbed by the same AMP stabilization signal. This leads to degradation of Signal to Interference and Noise Ratio (SINR) of the DL signal itself to each terminal, and also results in degradation of DL throughput to each terminal due to shallower Null depth and thus increased interference by beams from other terminals.

Therefore, the interference caused by the radiation of AMP stabilization signals cannot be avoided simply by improving the overshoot of the EVM of the head DL symbol by randomly inserting the AMP stabilization signals to the head DL symbol of the DL signal based on autonomous determinations of the AAS (RU).

As described above, in the wireless communication apparatus equipped with the transmission AMP with poor Gate/Drain Lag, improvement of the overshoot of the EVM in the head part of the transmission signal by inserting the AMP stabilization signal into the head part of the transmission signal is not sufficient, and the above-mentioned issues arise.

Therefore, in the wireless communication apparatus described above, when adopting a configuration of making the AMP stabilization signal interrupt the time domain preceding the time domain of the DL signal, it is necessary to autonomously determine whether to implement and stop the insertion of the AMP stabilization signal and to avoid the interference caused by the radiation of the AMP stabilization signal.

SUMMARY

In view of the aforementioned issues, an example object of the present disclosure is to provide a wireless communication apparatus, a wireless communication system, and a wireless communication method that can autonomously determine whether to perform or stop insertion of a stabilization signal and can avoid interference caused by radiation of a stabilization signal when adopting a configuration of making the stabilization signal interrupt a time domain preceding a time domain of the transmission signal.

A wireless communication apparatus according to an example aspect is a wireless communication apparatus including:

a plurality of transmitters;

a plurality of signal processing units each provided associated to each of the plurality of transmitters, each of the plurality of signal processing units being placed at a preceding stage of each associated transmitter;

a plurality of transmission amplifiers each provided associated to each of the plurality of transmitters, each of the plurality of transmission amplifiers being placed at a subsequent stage of each associated transmitter; and a determination unit, wherein the determination unit is configured to: detect presence or absence of a transmission signal for each transmission symbol in each of the plurality of transmitters, and, in response to detection of presence of the transmission signal in an arbitrary transmitter of the plurality of transmitters and absence of the transmission signal in all of the plurality of transmitters in a transmission symbol before a transmission symbol to which the any transmitter transmits the transmission signal, cause a stabilization signal to pass through the any transmitter and any transmission amplifier before the transmission signal passes through the any transmitter and the any transmission amplifier by controlling any signal processing unit provided associated to the any transmitter to insert the stabilization signal for stabilizing characteristics of the any transmission amplifier provided associated to the any transmitter into a time domain preceding a time domain of the transmission signal.

A wireless communication system according to an example aspect is a wireless communication system including:

the wireless communication apparatus; and a pre-processing apparatus placed at a preceding stage of the wireless communication apparatus and configured to perform alignment of transmission signals at the plurality of transmitters in the wireless communication apparatus and input the aligned transmission signals to the wireless communication apparatus.

A wireless communication method according to an example aspect is a wireless communication method being performed by a wireless communication apparatus including a plurality of transmitters, and a plurality of transmission amplifiers each provided associated to each of the plurality of transmitters, each of the plurality of transmission amplifiers being placed at a subsequent stage of each associated transmitter, the method including:

a step of detecting presence or absence of a transmission signal for each transmission symbol in each of the plurality of transmitters; and a step of causing, in response to detection of presence of the transmission signal in any transmitter of the plurality of transmitters and absence of the transmission signal in all of the plurality of transmitters in a transmission symbol before a transmission symbol to which the any transmitter transmits the transmission signal, a stabilization signal to pass through the any transmitter and any transmission amplifier before the transmission signal passes through the any transmitter and the any transmission amplifier by inserting the stabilization signal for stabilizing characteristics of the any transmission amplifier provided associated to the any transmitter into a time domain preceding a time domain of the transmission signal.

BRIEF DESCRIPTION OF DRAWINGS

The above and other aspects, features, and advantages of the present disclosure will become more apparent from the following description of certain example embodiments when taken in conjunction with the accompanying drawings, in which:

FIG. 1 is a drawing illustrating an example of TDD configuration in Germany's neighboring countries;

EXAMPLE EMBODIMENT

Hereinafter, example embodiments of the present disclosure will be described with reference to the drawings. Note that descriptions and drawings given below are abbreviated and simplified as appropriate for clarity of the descriptions. In each of the drawings given below, identical elements are denoted by the same reference signs, and duplicated explanations are omitted, as necessary. The specific numerical values, etc., shown below are only examples to facilitate understanding of this disclosure and are not limited thereto.

Overview of Example Embodiment

Before describing the details of each example embodiment of this disclosure, an overview of each example embodiment will be described. Again, it is assumed that a wireless communication apparatus equipped with a transmission AMP corresponds to an AAS (RU) configured to transmit a DL signal to each UE as a transmission signal.

Figure 2:
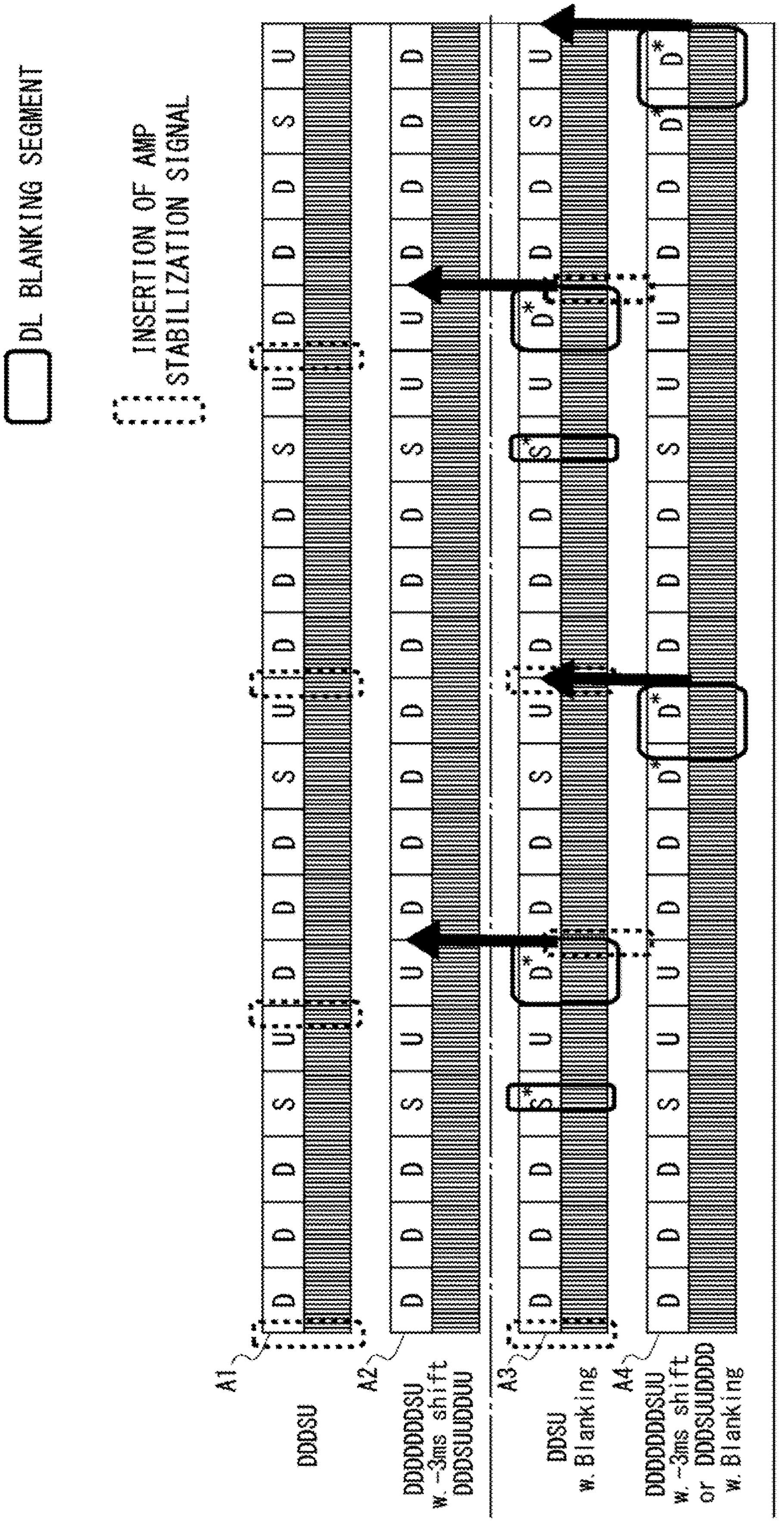
FIG. 2 is an explanatory drawing illustrating an overview of each example embodiment.

FIG. 2 is an explanatory drawing illustrating an overview of each example embodiment of the present disclosure.

In FIG. 2, A1 shows a TDD configuration of Germany. In addition, A1 shows insertion of the AMP stabilization signal performed by the AAS (RU) for domestic use, which has the TDD configuration of A1 and does not need to support DL blanking.

The AAS (RU) of A1 detects presence or absence of DL signals for each DL symbol for each of a plurality of TXs that constitutes the AAS (RU). The AAS (RU) of A1, in response to the detection of the presence of the DL signal, inserts the AMP stabilization signal into a time domain preceding the DL symbol (a time domain of the DL signal).

In FIG. 2, A2 shows a TDD configuration different from that in A1. A3 also shows the DL blanking and insertion of the AMP stabilization signal performed by the AAS (RU) in a case where the AAS(RU) having the TDD configuration of A1 is placed near the border of a neighboring country having an AAS (RU) having the TDD configuration of A2.

The AAS (RU) of A3 performs the DL blanking to avoid interference of DL signals with UL signals transmitted from RUs in neighboring countries having the TDD configuration of A2. Specifically, the AAS (RU) of A3 performs the DL blanking in the DL frame that overlaps the UL frame of A2. Note that the AAS (RU) of A3 also performs the DL blanking in a special subframe, because the 5G standard specifies to perform the DL blanking here.

The AAS (RU) of A3 detects presence or absence of DL signals for each DL symbol for each of a plurality of TXs that constitutes the AAS (RU). The AAS (RU) of A3, in response to the detection of the presence of the DL signal, inserts the AMP stabilization signal into a time domain preceding the DL symbol (the time domain of the DL signal). However, in DL frames where DL blanking is being performed, insertion of the AMP stabilization signal is stopped because no DL signal is detected.

In addition, if any one of the plurality of TXs is transmitting a DL signal in a DL symbol before a DL symbol to which the AMP stabilization signal is to be radiated, the radiation of the AMP stabilization signal may interfere with the DL signal being transmitted.

Therefore, even when the AAS (RU) of A3 detects the presence of a DL signal at a certain DL symbol in any of the plurality of TXs, the AAS (RU) of A3 stops the insertion of the AMP stabilization signal if it detects the presence of a DL signal at any of the plurality of TXs in a DL symbol before the certain DL symbol.

In other words, even when the AAS (RU) of A3 detects the presence of a DL signal at a certain DL symbol in any of the plurality of TXs as well as the absence of the DL signal in all of the plurality of TXs in a DL symbol before the certain DL symbol, the AAS (RU) of A3 inserts the AMP stabilization signal into a time domain preceding the certain DL symbol (the time domain of the DL signal).

In FIG. 2, A4 also shows the DL blanking and insertion of AMP stabilization signal performed by the AAS (RU) in a case where the AAS(RU) having the TDD configuration of A2 is placed near the border of a neighboring country having the AAS (RU) having the TDD configuration of A3.

The AAS (RU) of A4 performs the DL blanking to avoid interference of DL signals with UL signals transmitted from AASs (RUs) in neighboring countries having the TDD configuration of A3. Specifically, the AAS (RU) of A4 performs the DL blanking in the DL frame that overlaps the UL frame of A3.

As described above, according to each example embodiment of the present disclosure, the AAS (RU) detects presence or absence of DL signals for each DL symbol for each of the plurality of TXs. Even when the AAS (RU) detects the presence of a DL signal at a certain DL symbol in any of the plurality of TXs as well as the absence of the DL signal in all of the plurality of TXs in a DL symbol before the certain DL symbol, the AAS (RU) inserts the AMP stabilization signal into a time domain preceding the certain DL symbol (the time domain of the DL signal). In this manner, the AMP stabilization signal is made to pass through the transmission AMP before the DL signal passes through the transmission AMP.

In this manner, before the head DL symbol of the DL signal is input to the transmission AMP, the AMP stabilization signal is input to the transmission AMP to eliminate the current collapses and the Gate/Drain Lags of the transmission AMP in an early stage. This allows early ending of characteristic mutations caused by the current collapses and the Gate/Drain Lags of the transmission AMP and stabilization of nonlinear distortion characteristics such as Gain, Output, AM-AM/AM-PM of the transmission AMP. This avoids the occurrence of many problems caused by the overshoot of the EVM of the head DL symbol of the DL signal, thus ensuring signal quality from the head symbol of the DL signal and an arbitrary head DL symbol in a DL slot. At a moment when the head DL symbol of the DL signal is input to the transmission AMP, the AM-AM/AM-PM characteristics of the transmission AMP in a head DL symbol segment of the DL signal are pre-stabilized, so the head DL symbol and subsequent DL symbols of the DL signal are stably distortion-compensated by DPD in the TX. This also contributes to the fact that the head DL symbol guarantees the signal quality of the DL signal.

In DL frames where DL blanking is being implemented, the AAS (RU) stops insertion of the AMP stabilization signal because no DL signal is detected. In this manner, the AAS (RU) can autonomously determine whether to implement and stop insertion of the AMP stabilization signals, and thus can be placed at the border where DL blanking needs to be supported.

Even when the AAS (RU) detects the presence of a DL signal at a certain DL symbol in any of the plurality of TXs as well as the absence of the DL signal in all of the plurality of TXs in a DL symbol before the certain DL symbol, the AAS (RU) inserts the AMP stabilization signal into a time domain preceding the certain DL symbol (the time domain of the DL signal). This avoids interference of AMP stabilization signal radiation at one TX with DL signals transmitted from another TX.

The AMP stabilization signal will be described in more detail below.

Figure 3:
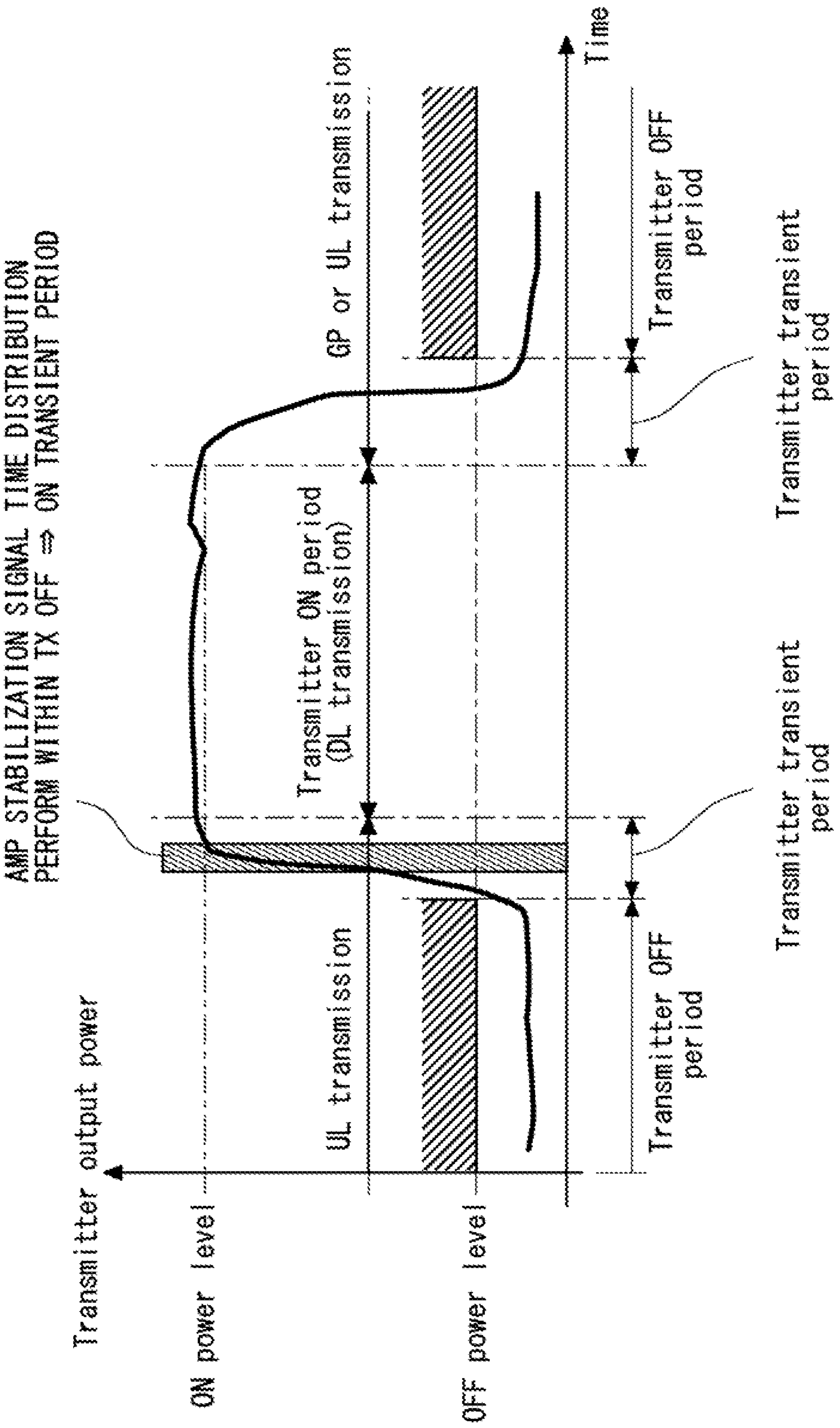
FIG. 3 is a drawing illustrating an example of a time distribution of an AMP stabilization signal.

FIG. 3 is a drawing illustrating an example of a time arrangement of an AMP stabilization signal.

As illustrated in FIG. 3, the AMP stabilization signal is placed in a time domain within the Tx ON transient period, for example, the period for switching TX from OFF to ON. The Tx ON transient period is specified as 10 μsec in Third Generation Partnership Project (3GPP: Registered Trademark) NR (New Radio).

Figure 4:
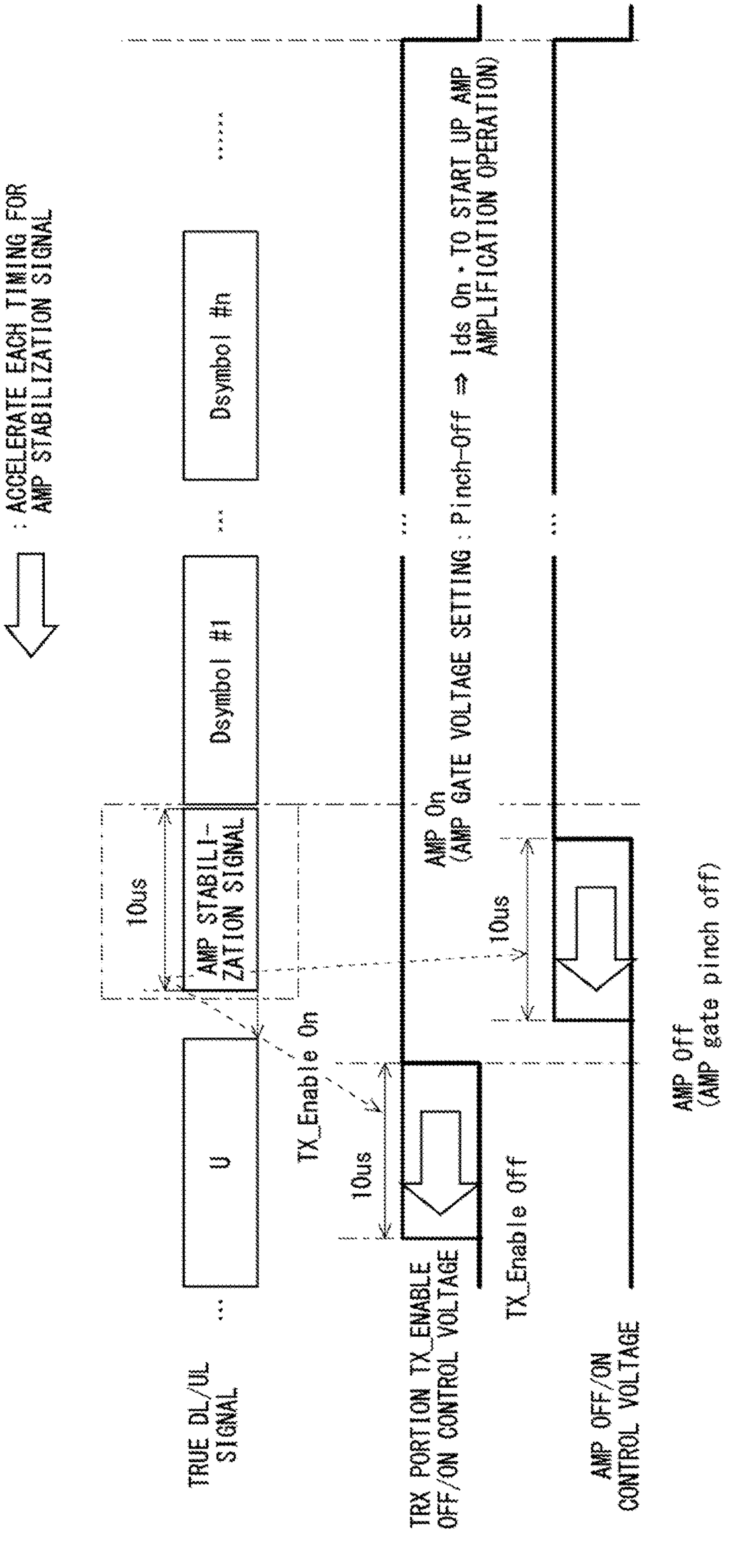
FIG. 4 is a timing chart illustrating an example of a change in processing start timing in association with insertion of an AMP stabilization signal in AAS.

FIG. 4 is a timing chart illustrating an example of a change in processing start timing in association with insertion of an AMP stabilization signal in AAS (RU).

As illustrated in FIG. 4, in each example embodiment, the AAS (RU) inserts the AMP stabilization signal in the time domain preceding the time domain of the DL signal. Therefore, if the length of the AMP stabilization signal is equivalent to 10 μsec, the AAS(RU) accelerates the timing of application of the control voltage TX_Enable ON to TX to enable the TX in TRX by 10 μsec. The AAS (RU) also accelerates the timing of application of the control voltage AMP ON to the transmission AMP by 10 μsec to turn the transmission AMP ON.

The following is a description of each example embodiment according to the present disclosure. The following also assumes that each wireless communication apparatus according to each example embodiment corresponds to an AAS (RU) configured to transmit a DL signal to each UE as a transmission signal.

First Example Embodiment

Figure 5:
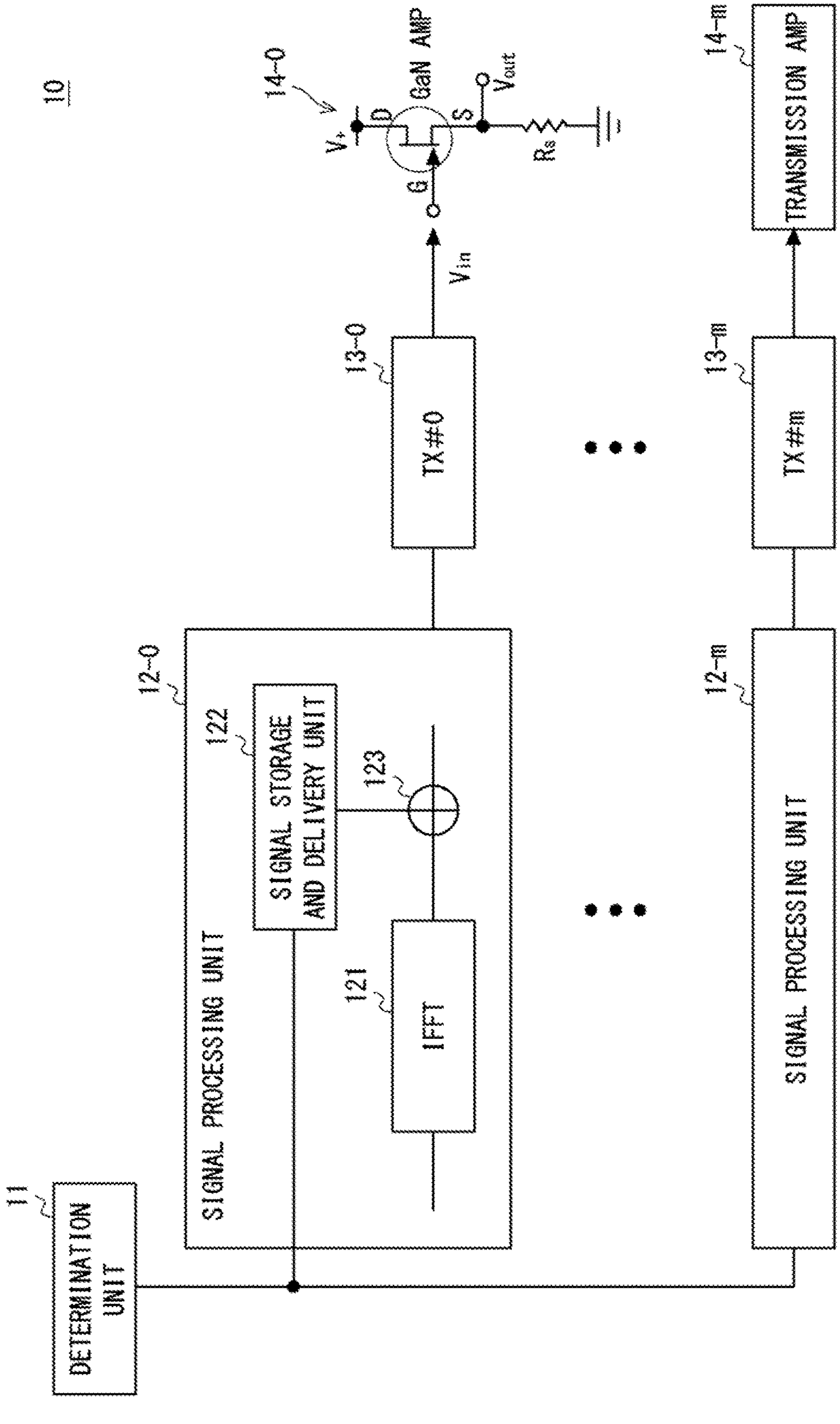
FIG. 5 is a drawing illustrating a configuration example of an AAS (RU) according to a first example embodiment.

FIG. 5 is a drawing illustrating a configuration example of an AAS (RU) 10 according to a first example embodiment. FIG. 5 illustrates only main components of the AAS (RU) 10 according to the first example embodiment, and other components (e.g., antennas, etc.) are omitted from illustration.

As illustrated in FIG. 5, the AAS (RU) 10 according to the first example embodiment includes a determination unit 11, a plurality of signal processing units 12-0 to **12-*m* (m is integers equal to or larger than 1), a plurality of TXs 13-0 to 13-*m* and a plurality of transmission AMPs 14-0 to 14-*m*. The TXs 13-0 to 13-*m* are transmitters and the transmission AMPs 14-0 to 14-*m* are GaN AMPs. Each of the signal processing units 12-0 to 12-*m* includes an Inverse Fast Fourier Transform (IFFT) unit 121, a signal storage and delivery unit 122, and an adder 123**.

In the following, when any specific one from the signal processing units 12-0 to **12-*m* is not specified, it will be referred to as "signal processing unit 12" as appropriate. Similarly, the TXs13-0 to 13-*m* are referred to as "TX 13" as appropriate, and the transmission AMPs 14-0 to 14-*m* are referred to as "transmission AMP14**" as appropriate.

The signal processing units 12-0 to **12-*m* are provided for each of the TXs 13-0 to 13-*m*, and each of the signal processing units 12-0 to 12-*m* is placed at a preceding stage of the corresponding TX 13**.

The transmission AMPs 14-0 to **14-*m* are provided for each of the TXs 13-0 to 13-*m*, and each of the transmission AMPs 14-0 to 14-*m* is placed at a subsequent stage of the corresponding TX 13**.

The signal processing unit 12-0 receives an input of a DL signal transmitted by the TX 13-0 from a Distributed Unit (DU)/Centralized Unit (CU), not illustrated, placed at a preceding stage of the AAS (RU) 10. Similarly, a DL signal transmitted by the TX **13-*m* is input to the signal processing unit 12-*m*** from the DU/CU.

The determination unit 11 detects presence or absence of the DL signal for each DL symbol (transmission symbol) for each of the TXs 13-0 to **13-*m***.

The determination unit 11, in response to detection of the presence of a DL signal at an arbitrary TX 13 among the TXs 13-0 to **13-*m*, detects presence or absence of a DL signal for all of the TXs 13-0 to 13-*m* at a DL symbol before the DL symbol to which the arbitrary TX 13 transmits a DL signal. The determination unit 11, in response to the detection of the absence of the DL signal at all of the TXs 13-0 to 13-*m*, performs AMP stabilization signal insertion control for the arbitrary TX 13**.

For example, suppose that the arbitrary TX 13 is the TX 13-0. In this case, the determination unit 11 controls the signal processing unit 12-0 to insert the AMP stabilization signal into a time domain preceding a time domain of the DL signal. Specifically, the determination unit 11 sends an AMP stabilization signal delivery instruction to the signal storage and delivery unit 122 in the signal processing unit 12-0. The AMP stabilization signal is a signal which, upon input into the transmission AMP 14-0, ends the current collapses and Gate/Drain Lags of the transmission AMP 14-0 in an early stage to stabilize a gain, an output, and nonlinear distortion characteristics in an early stage.

The signal processing units 12-0 to **12-*m* operate in substantially the same manner. The TXs 13-0 to 13-*m* also operate in substantially the same manner. The transmission AMPs 14-0 to 14-*m* operate in substantially the same manner. Therefore, the operations of the signal processing unit 12-0, the TX 13-0, and the transmission AMP 14-0** will be described below as representative.

The IFFT unit 121 converts a DL signal input from the DU/CU from a frequency-domain signal to a time-domain signal. For example, the determination unit 11 detects presence or absence of the DL signal at the TX 13-0 by performing a threshold determination in the frequency domain at a preceding stage of the IFFT unit 121.

The signal storage and delivery unit 122 stores the AMP stabilization signal to stabilize the characteristics of the transmission AMP 14-0.

The signal storage and delivery unit 122, upon reception of an AMP stabilization signal delivery instruction from the determination unit 11, sends the AMP stabilization signal to the adder 123.

Figure 6:
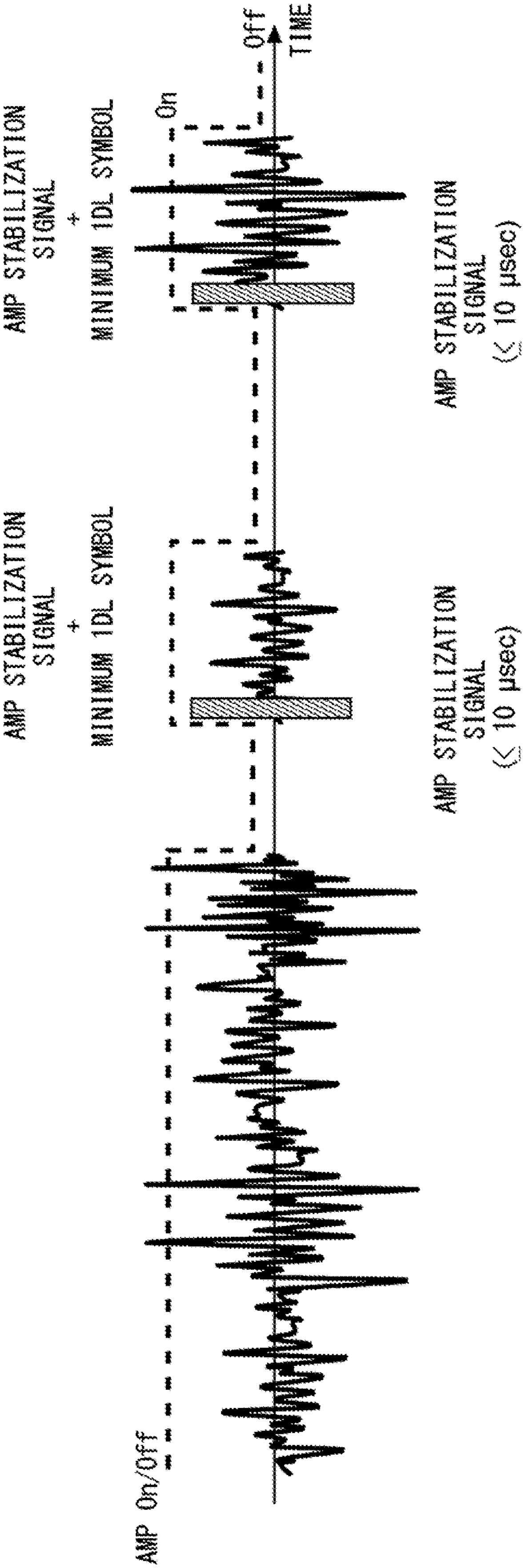
FIG. 6 is a drawing illustrating an example of AAS (RU) with the AMP stabilization signal interrupted in a time domain preceding a time domain of a DL signal according to the first example embodiment.

When the AMP stabilization signal is delivered from the signal storage and delivery unit 122, the adder 123 adds the received AMP stabilization signal to a time domain preceding a time domain of the DL signal output from the IFFT unit 121. In this manner, the AMP stabilization signal is inserted into the time domain preceding the time domain of the DL signal. At this time, the determination unit 11 calculates the time of the day when the DL signal is present inversely from the radiation time of the DL signal from the antenna, taking into account the processing time of the TX 13-0. The determination unit 11 then sends the AMP stabilization signal delivery instruction to the signal storage and delivery unit 122 at a timing such that the AMP stabilization signal is inserted into the beginning of the time of the day obtained by the inverse calculation. FIG. 6 is a drawing illustrating an example of insertion of the AMP stabilization signal into a time domain preceding the time domain of the DL signal.

This allows the AMP stabilization signal to pass through the TX 13-0 and the transmission AMP14-0 before the DL signal passes through the TX 13-0 and the transmission AMP14-0.

Here, during the TDD operation of the AAS (RU) 10, the time domain preceding the time domain of the DL signal assumes, for example, a Tx ON transient period, which is a period for switching the TX 13-0 from OFF to ON. Therefore, a time width of the AMP stabilization signal is set within the time width of the Tx ON transient period. The Tx ON transient period is specified as 10 μsec in 3GPP NR.

The frequency bandwidth of the AMP stabilization signal is set to the frequency bandwidth of the component carrier used to transmit the DL signal, for example.

The power level of the AMP stabilization signal is set to, for example, a power level at which the output of the transmission AMP 14-0 is at the maximum rated Root Mean Square (RMS) level and the same power level as the DL signal.

The TX 13-0, provided at a subsequent stage of the signal processing unit 12-0, converts the DL signal or the AMP stabilization signal output from the signal processing unit 12-0 from an In-Phase/Quadrature-Phase (IQ) signal to a Radio Frequency (RF) signal and outputs the RF signal to the transmission AMP 14-0. Note that the TX 13-0 is provided in a transmitter/receiver TRX, not illustrated. The TX 13-0 is also equipped with the DPP, etc., as described above, which are omitted in the illustration.

The transmission AMP14-0, provided at a subsequent stage of the TX 13-0, amplifies the DL signal or the AMP stabilization signal output from the TX 13-0 and outputs the amplified signal. The DL signal or the AMP stabilization signal output from the transmission AMP 14-0 is transmitted to each UE via an antenna, not illustrated.

Figure 7:
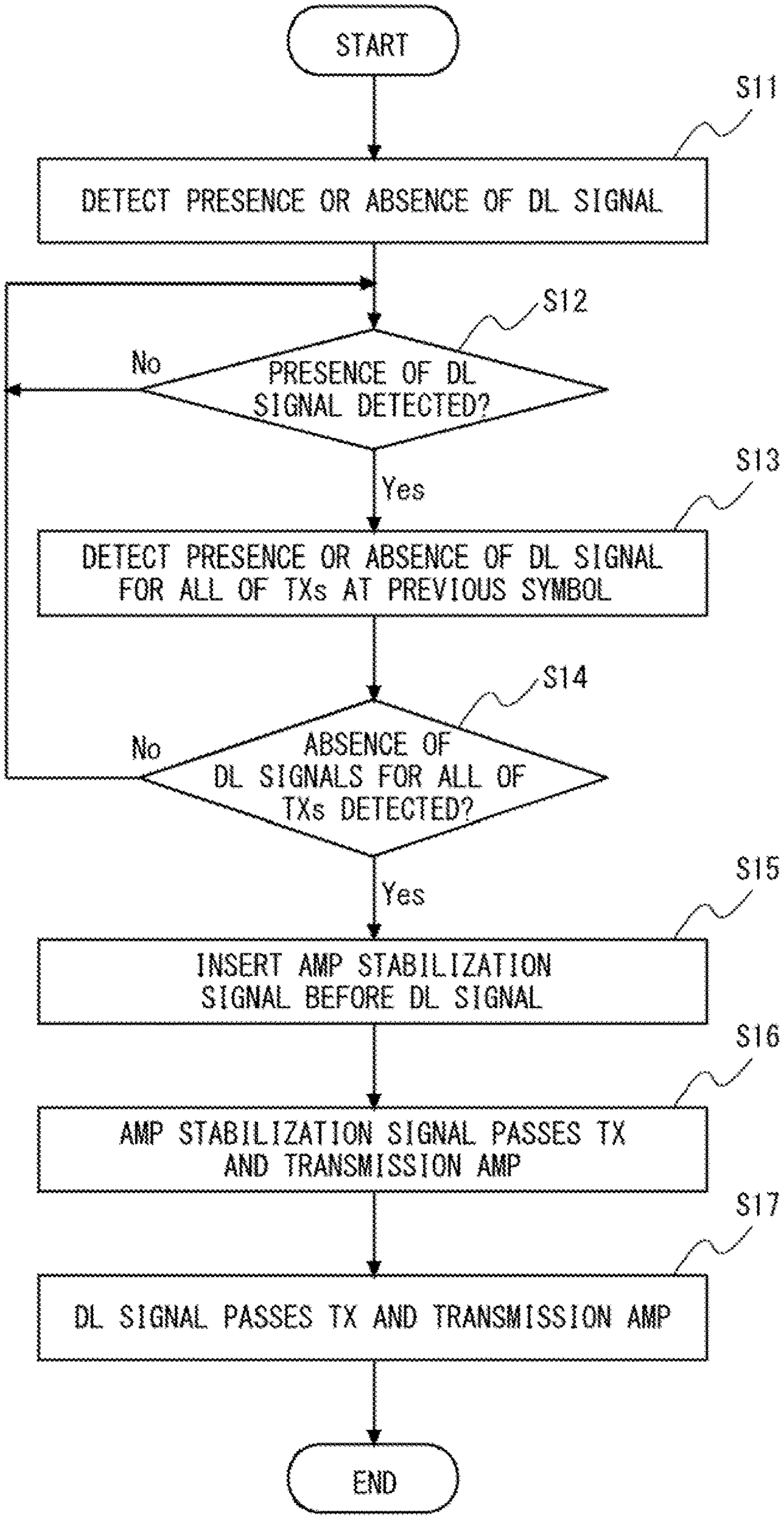
FIG. 7 is a flowchart explaining a schematic example of an operation of the AAS (RU) according to the first example embodiment.

FIG. 7 is a flowchart explaining a schematic example of an operation of the AAS (RU) 10 according to the first example embodiment.

As shown in FIG. 7, the determination unit 11 detects presence or absence of the DL signals for each DL symbol for each of the TXs 13-0 to 13-*m* (Step S11).

The determination unit 11, in response to detection of the presence of a DL signal at an arbitrary TX 13 among the TXs 13-0 to 13-*m* (Yes in Step S12), detects presence or absence of a DL signal for all of the TXs 13-0 to 13-*m* at a DL symbol before the DL symbol to which the arbitrary TX 13 transmits a DL signal (Step S13).

The determination unit 11, in response to detection of the absence of the DL signal for all TXs 13-0 to 13-*m* (Yes in step S14), sends the AMP stabilization signal delivery instruction to an arbitrary signal processing unit 12 corresponding to the arbitrary TX 13. Within an arbitrary signal processing unit 12, the signal storage and delivery unit 122 delivers the AMP stabilization signal to the adder 123, and the adder 123 adds the AMP stabilization signal to the time domain preceding the time domain of the DL signal output from the IFFT unit 121. In this manner, the AMP stabilization signal is inserted into a time domain preceding the DL symbol in which the DL signal is detected (the time domain of the DL signal) (Step S15).

Therefore, the AMP stabilization signal first passes through an arbitrary TX 13 and an arbitrary transmission AMP 14 corresponding to the arbitrary TX 13 (Step S16). This stabilizes the gain, the output, and the nonlinear distortion characteristics of the arbitrary transmission AMP 14. The DL signal then passes through the arbitrary TX 13 and the arbitrary transmission AMP 14 (step S17).

Figure 8:
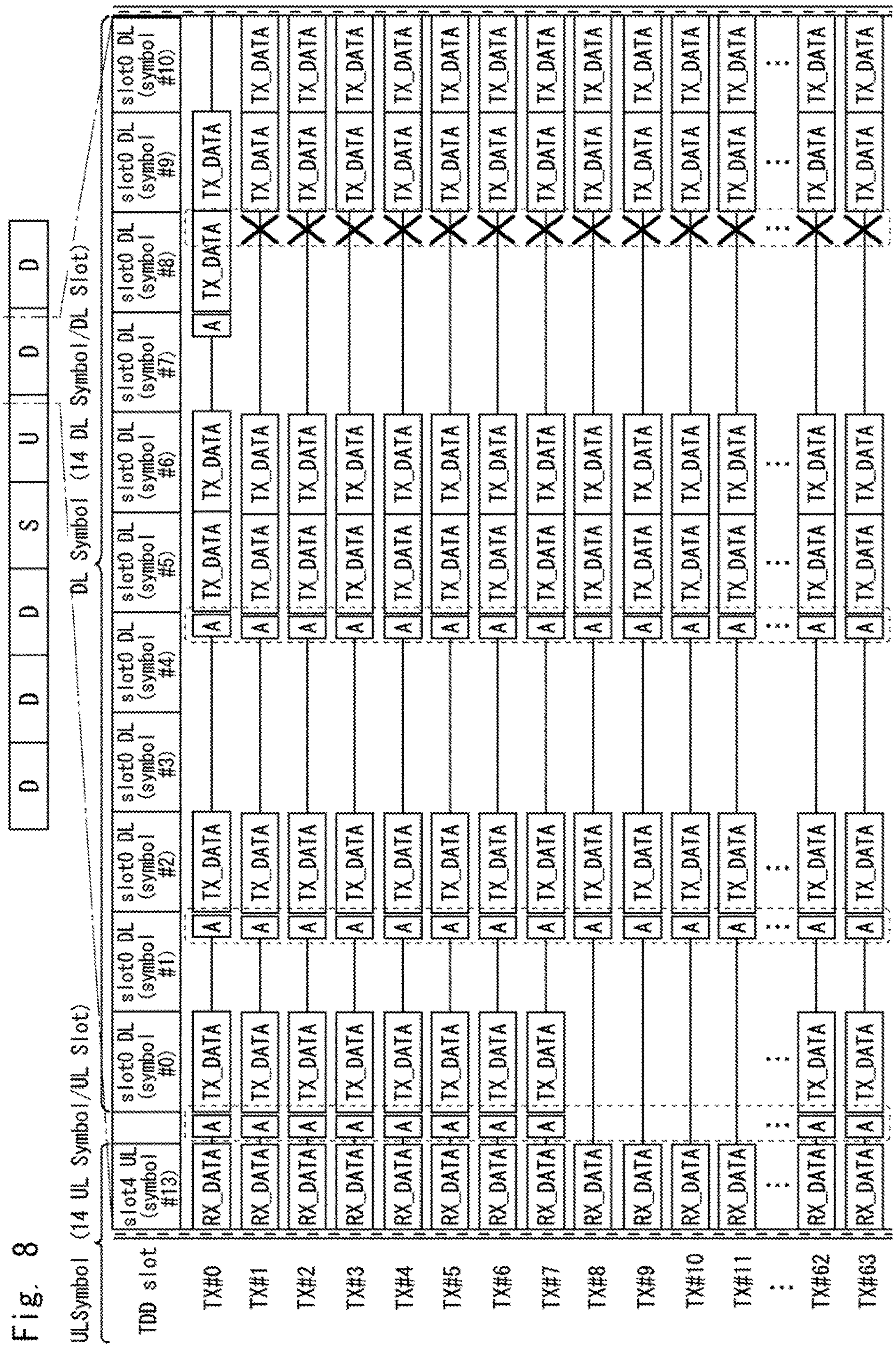
FIG. 8 is an explanatory drawing illustrating an example of a specific operation of the AAS (RU) according to the first example embodiment.

FIG. 8 is an explanatory drawing illustrating an example of a specific operation of the AAS (RU) 10 according to the first example embodiment. In the example in FIG. 8, the AAS (RU) 10 is equipped with 64 TXs #0 to #63 as the TX 13. One UL slot is composed of fourteen UL symbols, and one DL slot is composed of fourteen DL symbols. The AMP stabilization signal is represented by "A", the DL signal by "TX_DATA", and the UL signal by "RX_DATA" (same in FIGS. 10 to 12 below).

As illustrated in FIG. 8, the DL signals are present at the TXs #0 to #7 and the TXs #62 to #63 in DL symbol #0. In addition, since the DL symbol #0 is the head symbol of the DL slot, there is no DL symbol before the DL symbol #0. Therefore, the AMP stabilization signals are inserted into time domains preceding DL symbol #0 for the TX #0 to #7 and the TX #62 to #63.

In DL symbol #2, the DL signals are present at the TXs #0 to #63. Also, in DL symbol #1 before the DL symbol #2, the DL signal is absent at all of the TXs #0 to #63. Therefore, the AMP stabilization signals are inserted into time domains preceding the DL symbol #2 for the TXs #0 to #63.

In DL symbol #8, the DL signal is present only at the TX #0. Also, in DL symbol #7 before the DL symbol #8, the DL signal is absent at all of the TXs #0 to #63. Therefore, the AMP stabilization signals are inserted into time domains preceding the DL symbol #8 for the TX #0.

In contrast, in DL symbol #9, the DL signals are present at the TXs #0 to #63. However, in the DL symbol #8 before the DL symbol #9, the DL signal is present at the TX #0. In this case, when the AMP stabilization signals are inserted into the time domains preceding the DL symbol #9 for the TXs #1 to #63, the radiation of these AMP stabilization signals may cause interference with the DL symbol #8 of the DL signal from the TX #0. Therefore, the insertion of the AMP stabilization signals into the time domain preceding the DL symbol #9 for the TXs #1 to #63 is stopped.

As described above, according to the first example embodiment, in response to the detection of the presence of the DL signal in an arbitrary TX 13 of the TXs 13-0 to 13-*m* and the absence of the DL signal in all the TXs 13-0 to 13-*m* in the DL symbol before the DL symbol to which the arbitrary TX 13 transmits the DL signal, the determination unit 11 inserts the AMP stabilization signal to a time domain preceding the time domain of the DL signal. In this manner, the AMP stabilization signal is made to pass through the arbitrary TX 13 and the arbitrary transmission AMP 14 before the DL signal passes through an arbitrary TX 13 and an arbitrary transmission AMP 14 corresponding to the arbitrary TX 13.

In this manner, before the head DL symbol of the DL signal is input to the arbitrary transmission AMP 14, the AMP stabilization signal is input to the arbitrary transmission AMP 14 to eliminate the current collapses and the Gate/Drain Lags of the arbitrary transmission AMP 14 in an early stage. This allows early ending of characteristic mutations caused by current collapses and Gate/Drain Lags of the arbitrary transmission AMP 14 and stabilization of nonlinear distortion characteristics such as the gain, the output, AM-AM/AM-PM of the arbitrary transmission AMP 14. This enables suppression of the occurrence of overshoot in the EVM of the head DL symbol of the DL signal and maintenance of the communication quality of the head DL symbol of the DL signal. Consequently, this avoids the occurrence of many problems caused by the overshoot of the EVM of the head DL symbol of the DL signal, thus guaranteeing signal quality from the head DL symbol of the DL signal and an arbitrary head DL symbol in the DL slot. At a moment when the head DL symbol of the DL signal is input to the arbitrary transmission AMP 14, the AM-AM/AM-PM characteristics of the arbitrary transmission AMP 14 in the head DL symbol segment of the DL signal are stabilized in advance, so the head DL symbol and subsequent DL symbols of the DL signals are stably distortion-compensated by the DPD in the arbitrary TX 13. This also contributes to the fact that the head DL symbol guarantees the signal quality of the DL signal.

In addition, the determination unit 11 stops insertion of the AMP stabilization signal because no DL signal is detected in the DL symbol of the segment in which DL blanking is being implemented. In this manner, the AAS (RU) 10 can autonomously determine whether to implement and stop insertion of the AMP stabilization signals, and thus can be placed at the border where DL blanking needs to be supported.

In response to the detection of the presence of the DL signal in an arbitrary TX 13 of the TXs 13-0 to 13-*m* and the absence of the DL signal in all the TXs 13-0 to 13-*m* in the DL symbol before the DL symbol to which the arbitrary TX 13 transmits the DL signal, the determination unit 11 inserts the AMP stabilization signal to a time domain preceding the corresponding DL symbol (time domain of the DL signal). This avoids interference of AMP stabilization signal radiation at the arbitrary TX 13 with DL signals transmitted from another TX 13.

Second Example Embodiment

Figure 9:
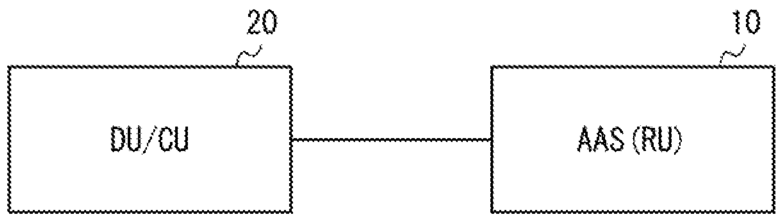
FIG. 9 is a drawing illustrating a configuration example of a wireless communication system according to a second example embodiment.

FIG. 9 is a drawing illustrating a configuration example of a wireless communication system according to a second example embodiment.

As illustrated in FIG. 9, the wireless communication system according to the second example embodiment includes the AAS (RU) 10 according to the first example embodiment described above and a DU/CU 20 placed at a preceding stage of the AAS (RU) 10. The DU/CU 20 is an example of a pre-processing device.

The DU/CU 20 performs alignment of DL signals in a plurality of TXs 13 in the AAS (RU) 10 and inputs the aligned DL signals to the AAS (RU) 10.

Figure 10:
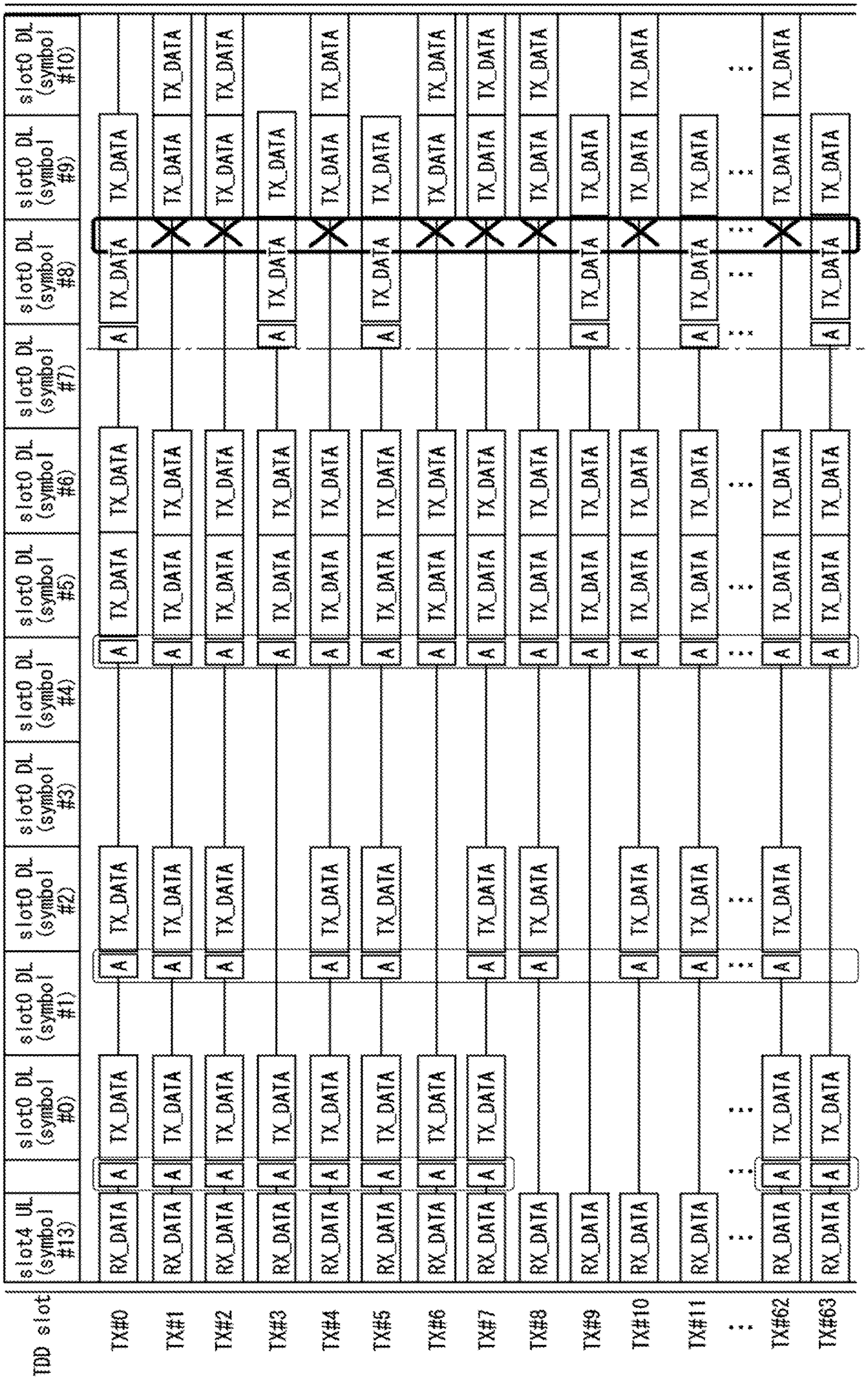
FIG. 10 is an explanatory drawing illustrating an example of a specific operation of the wireless communication system according to the second example embodiment.
Figure 11:
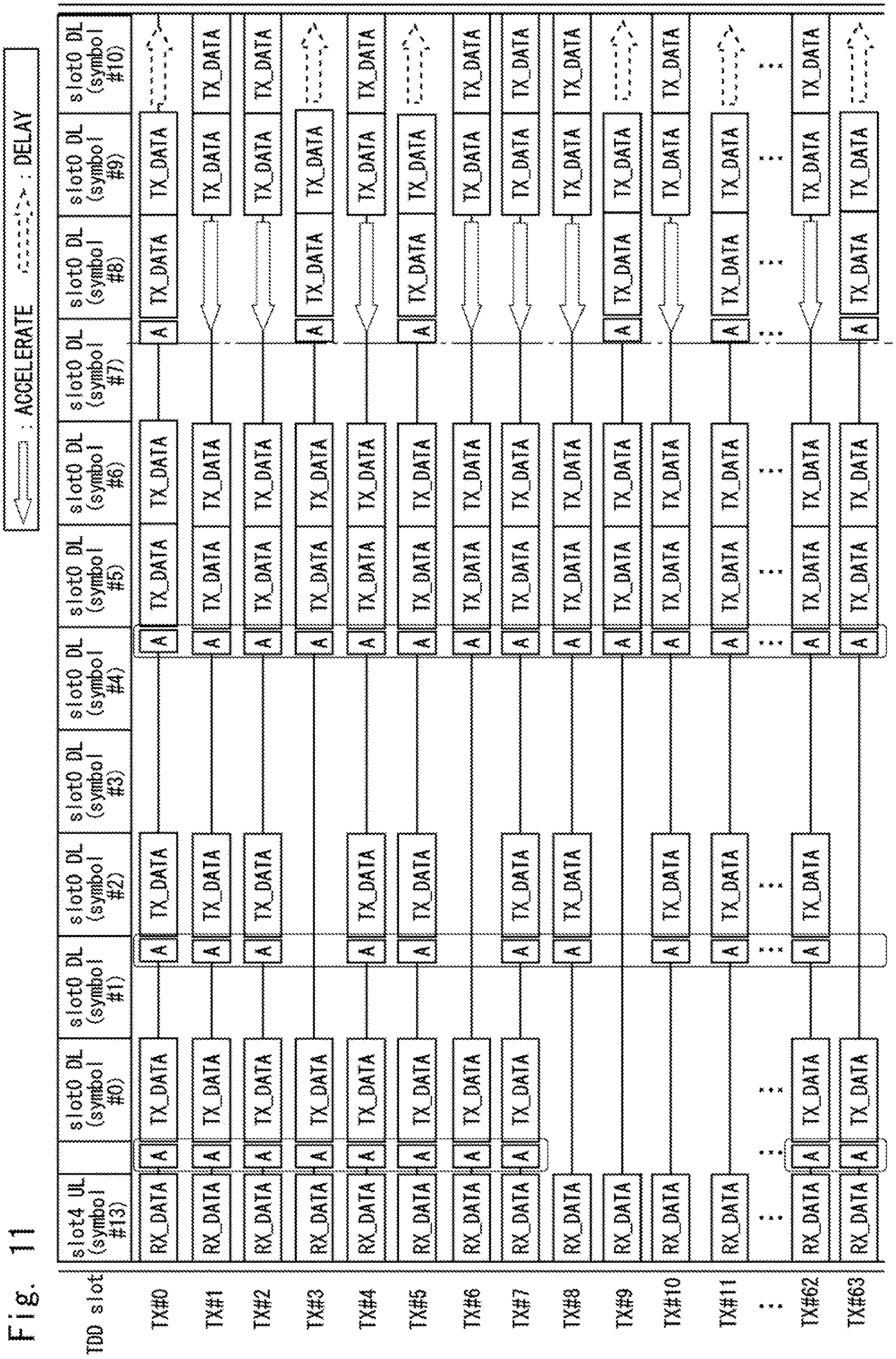
FIG. 11 is an explanatory drawing illustrating an example of a specific operation of the wireless communication system according to the second example embodiment.
Figure 12:
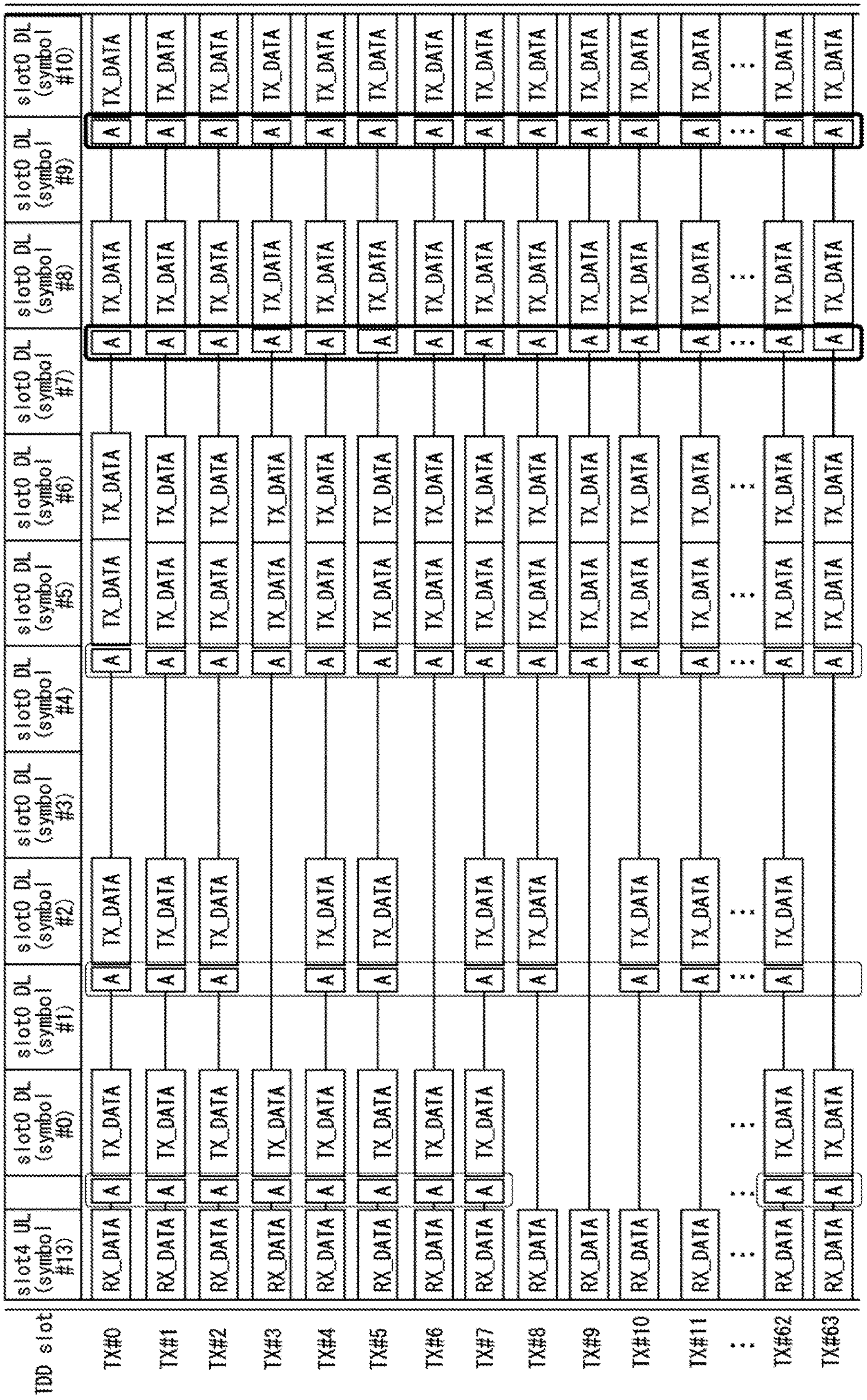
FIG. 12 is an explanatory drawing illustrating an example of a specific operation of the wireless communication system according to the second example embodiment.

FIG. 10 to FIG. 12 are explanatory drawings illustrating an example of a specific operation of a wireless communication system according to the second example embodiment.

As described above, in response to the detection of the presence of the DL signal in an arbitrary TX 13 of the plurality of TXs 13 and the absence of the DL signal in all of the plurality of TXs 13 in the DL symbol preceding the DL symbol to which the arbitrary TX 13 transmits the DL signal, the AAS (RU) 10 inserts the AMP stabilization signal to a time domain preceding the time domain of the DL signal.

Here, a case where the DL signals are placed as illustrated in FIG. 10 is assumed. In the example in FIG. 10, in the DL symbol #9, the DL signals are present at the TXs #1, #2, #4, #6 to #8, #10, and #62. However, in DL symbol #8 before DL symbol #9, the TX with the DL signal exists. Therefore, in order to avoid interference of radiation of the AMP stabilization signal with the DL signal, the AAS (RU) 10 stops insertion of the AMP stabilization signals to a time domain preceding the DL symbol #9 for the TXs #1, #2, #4, #6 to #8, #10, #62.

However, if the insertion of the AMP stabilization signal is stopped at the TXs #1, #2, #4, #6 to #8, #10, and #62, the characteristics of transmission AMPs 14 at their subsequent stages cannot be stabilized. As a result, an overshoot may occur in the EVM of the head DL symbol of the DL signal, which may cause a number of problems.

Therefore, as illustrated in FIG. 11, the DU/CU 20 performs alignment of the DL signals at the TXs #0 to #63. For example, the DU/CU 20 accelerates or delays the DL signal to collect all of the TXs #0 to #63 DL signals to a specific DL symbol such as that having many DL signals. In this manner, the DU/CU 20 will put the DL symbol into two states: the DL symbol with the DL signals at all of the TXs #0 to #63, and the DL symbol without DL signal at all of the TXs #0 to #63. In the example in FIG. 11, the DU/CU 20 accelerates the DL signals of the DL symbol #9 at the TXs #1, #2, #4, #6 to #8, #10, and #62 and places them at DL symbol #8, and delays the DL signals of the DL symbol #9 in the remaining TXs and places them at the DL symbol #10.

This results in a DL signal distribution at the TXs #0 to #63, as illustrated in FIG. 12, in which the DL signals are present at all of the TXs #0 to #63 for the DL symbols #8 and #10, and the DL signals are absent at all of the TXs #0 to #63 for the DL symbol #9.

As a result, the AAS (RU) 10 will be able to insert the AMP stabilization signal to the time domain preceding the DL symbols #8, #10 for the TXs #0 to #63.

According to the second example embodiment as described above, the DU/CU 20 performs alignment of DL signals at the plurality of TXs 13 in the AAS (RU) 10 and inputs the aligned DL signals to the AAS (RU) 10. This allows insertion of the AMP stabilization signal to be implemented even in cases where the insertion of the AMP stabilization signal could not be implemented in the first example embodiment described above. Other advantageous effects are the same as those in the first example embodiment described above.

The present disclosure has been described with reference to example embodiments thus far, but the present disclosure is not limited to the example embodiments described above. Various changes may be made to the configurations and details of the present disclosure that may be understood by those skilled in the art within a scope of the present disclosure.

For example, it is also possible to realize some of the functions of the wireless communication apparatus according to the present disclosure by causing a processor such as a central processing unit (CPU) to execute a program.

Figure 13:
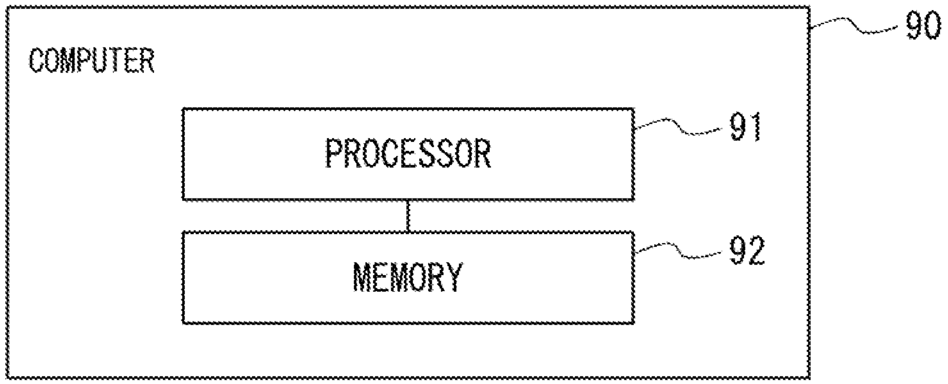
FIG. 13 is a drawing illustrating an example of a hardware configuration of a computer that realizes functions of part of a wireless communication apparatus according to the present disclosure.

FIG. 13 is a drawing illustrating an example of a hardware configuration of a computer 90 that realizes functions of part of the wireless communication apparatus according to the present disclosure.

As illustrated in FIG. 13, the computer 90 has a processor 91 and a memory 92.

The processor 91 may be, for example, a microprocessor, a CPU, or a Micro Processing Unit (MPU). The processor 91 may include a plurality of processors.

The memory 92 is composed of a combination of volatile and nonvolatile memories. The memory 92 may include a storage placed away from the processor 91. In this case, the processor 91 may access the memory 92 via an I (Input)/O (Output) interface, not illustrated.

The memory 92 stores the program. The program contains a set of instructions (or software codes) that, when loaded into the computer 90, causes the computer 90 to execute some of the functions of the AAS (RU) 10 according to the example embodiment described above. Components in the AAS (RU) 10 described above may be realized by the processor 91 reading and executing the program stored in the memory 92. The components with memory functions in the AAS (RU) 10 described above may be realized by the memory 92.

The programs described above may also be stored in a non-transient computer readable medium or a physical storage medium. By way of example, not limitation, a computer-readable media or a physical storage medium may include a random-access memory (RAM), a read-only memory (ROM), flash memory, a solid-state drive (SSD) or other memory technologies, a CD-ROM, a digital versatile disc (DVD), a Blu-ray (registered trademark) discs or other optical disc storages, a magnetic cassette, a magnetic tape, a magnetic disk storage, or other magnetic storage devices. The program may be transmitted on a temporary computer readable memory or a communication medium. By way of example, not limitation, a temporary computer readable memory or a communication medium may include electrical, optical, acoustic, or other forms of propagation signals.

Some functions of the DU/CU 20, which corresponds to the pre-processing device according to the present disclosure, may also be realized by the computer 90 shown in FIG. 13.

Also, the first and second embodiments can be combined as desirable by one of ordinary skill in the art.

What is claimed is:

1. A wireless communication apparatus comprising:

a plurality of transmitters;

a plurality of signal processing units, each of the plurality of signal processing units associated to a transmitter of the plurality of transmitters, each of the plurality of signal processing units being placed at a preceding stage of each associated transmitter;

a plurality of transmission amplifiers, each of the plurality of transmission amplifiers associated to the transmitter of the plurality of transmitters, each of the plurality of transmission amplifiers being placed at a subsequent stage of each associated transmitter; and a determination unit, the determination unit comprising a processor configured to process instructions to detect presence or absence of a transmission signal for each transmission symbol in each of the plurality of transmitters, and, in response to detection of presence of the transmission signal in a transmitter of the plurality of transmitters and absence of the transmission signal in all of the plurality of transmitters in a transmission symbol before a transmission symbol to which the transmitter transmits the transmission signal, cause a stabilization signal to pass through the transmitter and a transmission amplifier associated with the transmitter before the transmission signal passes through the transmitter and the associated transmission amplifier by controlling a signal processing unit associated to the transmitter to insert the stabilization signal for stabilizing characteristics of the transmission amplifier associated to the transmitter into a time domain preceding a time domain of the transmission signal.

2. The wireless communication apparatus according to claim 1, wherein each of the plurality of signal processing units includes:

a signal storage and delivery unit, wherein the signal storage and delivery unit comprises a memory configured to store the stabilization signal and, upon reception of a delivery instruction, deliver the stabilization signal;

an Inverse Fast Fourier Transform (IFFT) unit configured to convert the transmission signal from a frequency-domain signal to a time-domain signal; and an adder configured to add the stabilization signal delivered from the signal storage and delivery unit to a time domain preceding a time domain of the transmission signal being output from the IFFT unit when the stabilization signal is delivered from the signal storage and delivery unit, and the determination unit is configured to, in response to detection of presence of the transmission signal in the transmitter and absence of the transmission signal in all of the plurality of transmitters in a transmission symbol before a transmission symbol to which the transmitter transmits the transmission signal, send the delivery instruction to the signal storage and delivery unit in the signal processing unit.

3. The wireless communication apparatus according to claim 2, wherein the determination unit detects presence or absence of the transmission signal in each of the plurality of transmitters in a frequency domain at a preceding stage of the IFFT unit.

4. The wireless communication apparatus according to claim 1, wherein, when the wireless communication apparatus performs a Time Division Duplex (TDD) operation, a time width of the stabilization signal is set within a time width of a period for switching the transmitter from OFF to ON.

5. The wireless communication apparatus according to claim 1, wherein a frequency bandwidth of the stabilization signal is set to a frequency bandwidth of a component carrier to be used for transmitting the transmission signal.

6. The wireless communication apparatus according to claim 1, wherein a power level of the stabilization signal is set to a power level at which an output of the transmission amplifier is at a maximum rated Root Mean Square (RMS) level and to the same power level as the transmission signal.

7. The wireless communication apparatus according to claim 1, wherein the stabilization signal is a signal for, upon input into the transmission amplifier, generating a current collapse and a gate lag and a drain lag in the transmission amplifier and stabilizing a gain, an output, and nonlinear distortion characteristics of the transmission amplifier.

8. The wireless communication apparatus according to claim 1, wherein the transmission amplifier is an amplifier using Gallium Nitride (GaN) Field Effect Transistor (FET).

9. A wireless communication system comprising:

a plurality of transmitters;

a plurality of signal processing units, each of the plurality of signal processing units associated to a transmitter of the plurality of transmitters, each of the plurality of signal processing units being placed at a preceding stage of each associated transmitter;

a plurality of transmission amplifiers, each of the plurality of transmission amplifiers associated to the transmitter of the plurality of transmitters, each of the plurality of transmission amplifiers being placed at a subsequent stage of each associated transmitter; and a determination unit, the determination unit comprising a processor configured to process instructions to detect presence or absence of a transmission signal for each transmission symbol in each of the plurality of transmitters, and, in response to detection of presence of the transmission signal in a transmitter of the plurality of transmitters and absence of the transmission signal in all of the plurality of transmitters in a transmission symbol before a transmission symbol to which the transmitter transmits the transmission signal, cause a stabilization signal to pass through the transmitter and a transmission amplifier associated with the transmitter before the transmission signal passes through the transmitter and the associated transmission amplifier by controlling a signal processing unit associated to the transmitter to insert the stabilization signal for stabilizing characteristics of the transmission amplifier associated with the transmitter into a time domain preceding a time domain of the transmission signal; and a pre-processing apparatus placed at a preceding stage of the plurality of signal processing units and configured to perform alignment of transmission signals at the plurality of transmitters and input the aligned transmission signals to the plurality of transmitters.

10. A wireless communication method being performed by a wireless communication apparatus including a plurality of transmitters, and each of a plurality of transmission amplifiers each associated to a transmitter of the plurality of transmitters, each of the plurality of transmission amplifiers being placed at a subsequent stage of each associated transmitter, the method comprising:

a step of detecting presence or absence of a transmission signal for each transmission symbol in each of the plurality of transmitters; and a step of causing, in response to detection of presence of the transmission signal in a transmitter of the plurality of transmitters and absence of the transmission signal in all of the plurality of transmitters in a transmission symbol before a transmission symbol to which the transmitter transmits the transmission signal, a stabilization signal to pass through the transmitter and a transmission amplifier associated with the transmitter before the transmission signal passes through the transmitter and the transmission amplifier by inserting the stabilization signal for stabilizing characteristics of the transmission amplifier associated to the transmitter into a time domain preceding a time domain of the transmission signal.

* * * * *